US007133060B2

(12) United States Patent
Braun

(10) Patent No.: US 7,133,060 B2
(45) Date of Patent: Nov. 7, 2006

(54) METHOD FOR APPLYING IMAGES TO WAX ARTICLES

(76) Inventor: Dominic Braun, Artherstrasse 478, Walchwil, CH-6318 (CH)

( * ) Notice: Subject to any disclaimer, the term of this patent is extended or adjusted under 35 U.S.C. 154(b) by 0 days.

(21) Appl. No.: 10/477,387

(22) PCT Filed: May 10, 2002

(86) PCT No.: PCT/GB02/02174

§ 371 (c)(1),
(2), (4) Date: May 3, 2004

(87) PCT Pub. No.: WO02/092361

PCT Pub. Date: Nov. 21, 2002

(65) Prior Publication Data

US 2004/0179085 A1 Sep. 16, 2004

(30) Foreign Application Priority Data

May 14, 2001 (GB) ................................ 0111775.3

(51) Int. Cl.
*B41J 2/325* (2006.01)
*B32B 1/08* (2006.01)

(52) U.S. Cl. ...................................... 347/213; 156/240

(58) Field of Classification Search ................ 430/256; 347/213; 428/484; 156/240
See application file for complete search history.

(56) References Cited

U.S. PATENT DOCUMENTS

| | | | | |
|---|---|---|---|---|
| 3,861,306 | A * | 1/1975 | DuBois et al. | 101/450.1 |
| 3,952,992 | A * | 4/1976 | Vyprachticky | 249/104 |
| 3,974,014 | A * | 8/1976 | Meisner et al. | 156/240 |
| 5,605,765 | A * | 2/1997 | Rudick | 428/484.1 |
| 6,197,409 | B1 * | 3/2001 | Bodager et al. | 428/32.24 |

* cited by examiner

*Primary Examiner*—John L Goodrow
(74) *Attorney, Agent, or Firm*—Brown Raysman Millstein Felder & Steiner LLP

(57) ABSTRACT

A method for applying an image to a target wax article is provided. The method comprises the steps: a) forming a reverse of the image on wax-coated transfer paper; b) transferring and reversing the reverse image to produce the image on the surface of a carrier wax article; and c) mounting the carrier wax article bearing the image to the target wax article. Wax articles, in particular candles, produced by the method are also provided.

7 Claims, No Drawings

METHOD FOR APPLYING IMAGES TO WAX ARTICLES

This application is a National Phase entry of PCT International Application, Serial No. PCT/KB02/021714, filed 10 May 2002, and claims priority from Great Britain Application No. 0111775.3, filed 14 May 2001.

BACKGROUND OF THE INVENTION

This invention relates to a method for applying an image to a wax article. The invention also relates to wax articles, in particular candles, produced by the method.

It has long been known to apply images to candles. In particular candles sold for special occasions (either public festivals such as religious festivals, or private celebrations such as weddings) may bear images commemorating that occasion.

One method of applying such an image to a candle is to form the image on paper or similar material, and mount the material bearing the image to the candle. However, as paper is more combustible than wax, the paper catches fire when the candle burns, and the image on the paper is burnt away or rendered unrecognizable long before the candle is burnt out. Moreover, as paper does not adhere well of its own accord to wax, it would be necessary to use adhesive, staples or other such material to mount the paper etc. To the candle: this adds an extra step which may be difficult to automate, and an adhesive may interfere with the burning of the candle.

GB 1466550 and U.S. Pat. No. 4,030,959 suggest a solution to this problem, by providing a method of transferring images to wax candles, comprising imprinting the image onto a waxed transfer sheet by conventional gravure or lithographic techniques, and then wrapping the imprinted sheet around the candle body while applying heat and pressure thereto.

JP-A-8-197899 discloses two processes for printing candles. One method involves forming a printed image on the release surface of a release sheet expressed with thermal copying toner without thermal fixing (for example, by using a thermal copying machine wherein the heating and pressurising roller has been removed, or by removal of the printed image from the copying machine before it reaches the heating and pressurising roller). The printed image is then adhered to the surface of the candle by the application of pressure. The sheet is then released and the printed image then heated to fuse the toner and soften the surface of the candle. This is stated to allow the toner to fuse on the surface of the candle in a uniform manner.

Another method disclosed by JP-A-8-197899 involves forming a printed image on the release surface of a release sheet expressed with thermal copying toner, heating the surface of the sheet bearing printed image without the application of pressure in order to fuse the toner, adhering the printed image to the surface of the candle, removing the release sheet, and coating the printed image on the surface of the candle with paraffin.

JP-A-2-33397 discloses a transfer paper consisting of a release paper, a printed image-bearing layer and an adhesive layer comprising an adhesive agent which includes rice wax or candela wax having a melting point between 60° C. And 100° C. The document further discloses a method for decorating candles, in which the transfer paper is cut to a predetermined size and is then inserted into a could so that the printed image-bearing layer faces inwards. Molten paraffin wax is then cast into the could, which is then allowed to cool so that the paraffin wax solidifies and the image is transferred to the candle. The release paper is then removed to produce the finished candle.

DE-A1-19649545, DE-U-29623315 and UP-B-941161, all to Bubeck, describe an alternative process for forming color printed images on wax articles and the like, comprising the steps:

a) forming a reverse copy of the desired image on wax-coated transfer paper by means of a color photocopier;
b) fixing the copy to the article; and
c) pressing the copy on to the article by means of suitably shaped tools.

However, a number of problems exist with the method described in the Bubeck documents. A specially shaped tool, corresponding exactly to the shape and size of the required wax article, is required to transfer the image to the surface of the wax article (eg a cylindrical tool for a candle). If the mould is not exact, the image transfer will not be performed cleanly. Temperatures of 60 to 200° C. And pressures of up to 30 bar are required to effect the transfer, and expensive, complex equipment is therefore required. It is also necessary to fix the transfer sheet to an exact location on the wax article before applying pressure: this requires an additional step of forming locating or marking holes or the like in the article. Furthermore, it is necessary to cut the transfer sheet bearing the image to shape before fixing it to the wax article. In addition, in the process described in the above documents, good adhesion of the wax-coated transfer paper to the wax article requires the surfaces of both to be smooth: adhesion is unsatisfactory when either the wax article or the transfer paper has a rough surface. Moreover, as the Bubeck process requires the use of a white wax sheet, production of color images on candles is rendered difficult.

In addition, the quality of the image produced by this method is unsatisfactory: the image may peel off the wax surface, particularly at low temperatures. A protective coating of wax or lacquer is required to protect the material. Finally, due to the complexity and cost of setting up the equipment to carry out this method, it is suitable only for production of large numbers of candles etc., production of smaller numbers of candles (eg. for private celebrations) being uneconomic.

SUMMARY OF THE INVENTION

It is an object of the present invention to provide a method for applying an image to a wax surface which avoids the problems of the prior art.

These and other objectives are achieved by the present invention as defined in the appended claims.

The invention therefore provides in a first aspect a method for applying an image to a target wax article, comprising the steps:

a) forming a reverse of the image on wax-coated transfer paper;
b) transferring and reversing the reverse image to produce the image on the surface of a carrier wax article; and
c) mounting the carrier wax article bearing the image to the target wax article.

The invention provides in a second aspect a wax article, in particular a candle, produced by the above method.

Each of these steps will now be described in more detail.

DETAILED DESCRIPTION

In step a), a reverse of the image is formed on wax-coated transfer paper. The reverse image may be formed using conventional photocopying or laser printing techniques which are well known to those skilled in the art.

The transfer paper must be coated with wax, as this makes possible the transfer of the reverse image to the surface of the carrier wax article in step b) described below. Examples of suitable waxes include natural waxes including vegetable waxes such as candela wax, cuassu wax, candelila wax, ouricuni wax, raffia wax, palm wax, rice wax, candela wax, esparto wax, sugar cane wax and cotton wax; animal waxes such as beeswax and lanolin; mineral waxes such as paraffin waxes, microcrystalline waxes and petroleum wax; and synthetic waxes such as fatty acid esters of di- or trihydric alcohols, including but not limited to glyceryl distearate, glyceryl monostearate and ethylene glycol monostearate. Typically, the wax on the surface of the transfer paper has a thickness of between 0.0001 and 0.01 mm, preferably 0.0005 to 0.005 mm.

In step b), the reverse image is transferred from the wax-coated transfer paper to the surface of a carrier wax article. During this step, the reverse image is reversed again to recreate the image the right way round on the surface of the carrier wax article.

The carrier article is made of wax, and any suitable wax known in the art may be used. Examples of suitable waxes those include those referred to above in relation to the wax coating for the transfer paper: it should however be noted that the carrier article need not be made from the same type of wax as the coating on the transfer paper, nor the same type of wax as the target article. Waxes having a low melting point (ie between room temperature and 80° C., and particularly between 40° C. And 60° C.) are preferred.

In order to be capable of bearing the image, it is important that the carrier wax article possesses a flat surface. It is preferred that the carrier article is a wax sheet, in particular a wax sheet of thickness of between 0.2 mm and 5 mm, especially 0.5 to 2 mm.

Step b) is preferably carried out by thermal transfer means, the nature of which is well known to those skilled in the art. It is preferred that the thermal transfer is carried out slowly in order to minimise the risk of overheating and damage to the image and the articles. Preferably, the thermal transfer is carried out at a temperature of 40 to 130° C. More preferably the process is carried out at a temperature of 90 to 110° C. Typically, the thermal transfer process takes 10 seconds to 2 minutes, preferably 20 to 40 seconds. In an alternative embodiment, the thermal transfer process is carried out at a temperature of 45 to 60° C. And takes 10 minutes to 2 hours, preferably 20 minutes to 1 hour.

It is especially preferred that, in step b), shielding means is present between the heating element and the surfaces between which the image is being transferred. This further minimises the risk of overheating and damage to the image and the articles. Any insulator may be used as the shielding means; insulators typically used in ironing, especially a sheet of cotton cloth, are preferred.

Finally, in step c), the carrier wax article, bearing the image, is mounted to the target wax article. This is carried out by the application of heat and pressure to the carrier wax article, bearing the image, to bond it to the target wax article. Any means known in the art to be suitable for doing so may be used. The process is preferably carried out at only slightly elevated temperature, ie just above room temperature (more preferably between 30° C. To 45° C.) and at low pressures, ie those comparable to the pressure exerted by the human hand when applying or adhering two surfaces together. In a particularly preferred embodiment, the carrier article is mounted to the target wax article by hand.

The method conveys a number of advantages over the prior art. Firstly, images of a superior graphic quality can be produced on the target wax article. Furthermore, the process is simple and efficient.

In particular, the provision of step b), not present in the prior art, overcomes a number of disadvantages. It becomes unnecessary to fix the transfer sheet to the wax article (by forming locating holes or using adhesives or the like): the transfer sheet can be simply laid onto the carrier wax article before transfer to the target wax article. Nor is it necessary to cut the transfer sheet to shape before pressing it onto the carrier wax article, as would be required in the Bubeck processes. Furthermore, the specially shaped tools required by the Bubeck processes are also rendered unnecessary: a flat blade will suffice.

There is also no need to carry the process out using the high temperatures and pressures and specialist, complicated equipment required by the prior art methods. In additions the process of the present invention does not require ultra-smooth surfaces to secure adhesion of the carrier wax article to the target wax article: it is, in fact, advantageous if the surface of either or both articles is roughened prior to the mounting step.

Moreover, when the process of the present invention is applied to cylindrical wax articles such as candles, an image can be mounted around the entire circumference of the article. This is not possible in the prior art processes described above.

The process of the present invention enables the production, in an economic manner, of high-quality decorated candles etc. in small numbers, making the process suitable for producing candles for special occasions. Candles etc. bearing full color images may be produced by the process of the present invention.

In addition, the image formed on the wax articles of the present invention is resistant to peeling at low temperatures, and no coating is required to protect the image. Finally, as the image is formed on a wax surface, the wax bums at the same rate as the remainder of the wax article, thus preserving the image for a lifetime comparable to that of the candle.

In preferred embodiments, the image can be cut out of the carrier wax article before mounting on the target wax article. Provided that the carrier wax article is of suitable thickness, this can give the image on the wax article a three-dimensional appearance.

The invention will now be described in detail with reference to the following, non-limiting examples.

EXAMPLE 1

Using a Nashuatec™ CS560 color photocopier, a reverse image on B+L A4 paper (Art.No 5.006) (available from B+L Drucktechnologie GmbH, Emmendingen, Germany) coated with wax is made of a photograph printed on B+L A4 paper (Art.No 5.006). The wax-coated paper, bearing the reverse image, is laid face down on a 1 mm thick sheet of Zengerle™ wax. A Hot ones™ heat transfer press (40×40 cm; Serial No 902937), operating at 100° C. is then applied for 30 seconds to transfer the image from the wax-coated paper to the wax sheet. A cloth of cotton is present between the heat source and the two surfaces to shield the surfaces and prevent overheating. The wax sheet is then allowed to cool before taking away the wax coated paper and applying the wax sheet to a candle by gently pressing it on to the candle by hand.

EXAMPLE 2

Example 1 was repeated, except that the image was transferred from the wax-coated paper to the wax sheet in an oven operating at 52° C. under the pressure of a 350 g weight for 50 min.

The invention claimed is:

1. A method for applying an image to a target wax article, comprising the steps:

a) forming a reverse of the image on wax-coated transfer paper;

b) transferring and reversing the reverse image to produce the image on a flat surface of a carrier wax article; and c) mounting the carrier wax article bearing the image to the target wax article.

2. A method according to claim 1, wherein step a) is carried out using a photocopier or a laser printer.

3. A method according to claim 1, wherein step b) is carried out by thermal transfer means.

4. A method according to claim 3, wherein the thermal transfer is carried out at a temperature of 40 to 130° C.

5. A method according to any preceding claim 1, wherein, in step b), shielding means is present between the heating element and the surfaces between which the image is being transferred.

6. A method according to claim 1, wherein the image is cut out of the carrier wax article before mounting on the target wax article.

7. A method according to claim 3, wherein, in step b), shielding means is present between the heating element and the surfaces between which the image is being transferred.

* * * * *